United States Patent [19]

Steptoe et al.

[11] Patent Number: 5,403,977
[45] Date of Patent: Apr. 4, 1995

[54] CABLE-SEALING MASTIC MATERIAL

[75] Inventors: Neil J. Steptoe, Swindon; Paul Taylor, NR Swindon, both of England

[73] Assignee: Raychem Limited, London, United Kingdom

[21] Appl. No.: 75,585

[22] PCT Filed: Dec. 19, 1991

[86] PCT No.: PCT/GB91/02275
§ 371 Date: Nov. 30, 1993
§ 102(e) Date: Nov. 30, 1993

[87] PCT Pub. No.: WO92/11675
PCT Pub. Date: Jul. 9, 1992

[30] Foreign Application Priority Data
Dec. 20, 1990 [GB] United Kingdom ............... 9027638

[51] Int. Cl.⁶ .................. H02G 15/08; B32B 11/00
[52] U.S. Cl. ............................ 174/77 R; 156/49; 174/76; 174/88 R; 174/DIG. 8; 428/68
[58] Field of Search ............ 174/77 R, 76, DIG. 8, 174/88 R; 156/49; 428/68

[56] References Cited

U.S. PATENT DOCUMENTS

| | | | |
|---|---|---|---|
| 3,852,516 | 12/1974 | Vander Ploog et al. | 174/76 |
| 4,485,269 | 11/1984 | Steinberg | 174/84 R |
| 4,589,939 | 5/1986 | Mohebban et al. | 174/88 R |
| 4,622,252 | 11/1986 | Strobeck | 428/88 |
| 4,624,720 | 11/1986 | Pithouse et al. | 174/DIG. 8 |
| 4,741,709 | 5/1988 | Jervis | 439/521 |
| 4,755,241 | 7/1988 | Steinberg | 174/84 R |
| 4,761,193 | 8/1988 | Pithouse et al. | 156/85 |
| 4,849,580 | 7/1989 | Feuter | 174/92 |
| 4,863,535 | 9/1989 | More | 174/76 |
| 4,935,582 | 6/1990 | Calligaris | 174/76 |
| 4,940,820 | 7/1990 | Pithouse et al. | 174/DIG. 8 |
| 4,963,700 | 10/1990 | Olsen et al. | 174/138 F |
| 5,281,763 | 1/1994 | Hey et al. | 174/84 R |

FOREIGN PATENT DOCUMENTS

| | | |
|---|---|---|
| 2624665 | 6/1989 | France . |
| 3327821 | 4/1984 | Germany . |
| 9004669.2 | 6/1990 | Germany . |
| 1278171 | 6/1972 | United Kingdom . |
| 2097203 | 10/1982 | United Kingdom . |
| 2100281 | 12/1982 | United Kingdom . |
| 2173959 | 10/1986 | United Kingdom . |

OTHER PUBLICATIONS

Derwent abstract 84-108565/18 (abstract of DE 3327821).

Primary Examiner—Morris H. Nimmo
Attorney, Agent, or Firm—Herbert G. Burkard; Yuan Chao

[57] ABSTRACT

A close-fitting box (110, 120 FIG. 3) maintains a sheet (100) of mastic in sheet form for wrapping around a cable splice (FIG. 7) to supply large volume of mastic to fill the enclosure formed by applying a heat-shrinkable sleeve (250, FIG. 11) around the mastic-wrapped splice.

19 Claims, 5 Drawing Sheets

CABLE-SEALING MASTIC MATERIAL

This invention relates to cable-sealing mastic material, by which is meant a mastic or similar material which is capable of use for sealing cables; and to a kit of parts for cable sealing including such material; and to methods of cable sealing using such material.

It is known to seal cables in order to prevent water or other fluids from travelling along inside the cable, and especially to prevent ingress of water into cable joints, splices or terminations, where bare electrical connections are usually present. Relatively free-flowing materials may be squeezed or pumped into the cable for this purpose, for example as described in GB-A-2100281; free-pouring curable resins are known for filling cable splices; high viscosity hot melt materials have been used, for example as described in GB-B-2087203. The high-viscosity hot melt materials are conveniently provided on the inner surface of a heat-recoverable sleeve used to seal a cable joint. This is very successful in joints where the amount of free space to be filled by the hot melt material is relatively small and of relatively uniform diameter, as illustrated in the aforementioned GB-B-2097203. However, this technique is unsatisfactory where larger volumes of irregular diameter must be filled, since it is difficult or impossible to heat the necessary large volume of hot melt material sufficiently for adequate flow without overheating and damaging the heat-recoverable sleeve.

The present invention provides cable-sealing material in an unusual form which overcomes or alleviates this difficulty and is more convenient to use than the known alternatives of pumping or pouring flowable materials into the cable.

The invention accordingly provides cable-sealing mastic material inherently capable of significant creeping flow in storage, which material is in sheet form in a close-fitting storage container, which container (a) is arranged to resist the said flow in all directions and so maintains the material substantially in the said sheet form in storage, and (b) is lined and/or otherwise arranged to permit application of the material substantially still in the said sheet form to parts of a cable to be sealed by the said material in use.

We have discovered that provision of the cable-sealing material in this unconventional form enables relatively low-melting-point mastic materials to be handled conveniently in large amounts, which have been found impracticable to carry on the inner surface of a heat-recoverable sleeve.

The materials may thus be selected to be sufficiently fluid, at temperatures to be encountered inside a heat-recoverable sleeve during heat recovery, to ensure complete and uniform filling of quite large and irregular volumes, for example those found in low-voltage or medium-voltage cable splices, as hereinafter described. We have found that the best materials of this kind for the present purposes tend to undergo significant creeping flow in storage, which will be understood to mean sufficient creeping flow to distort the sheet to an inconvenient or unacceptable extent. By maintaining the mastic in sheet form, the storage container tends to prevent the inherent creeping flow of such materials from distorting the sheet during storage into inconvenient or unusable forms, which, for example could not readily be wrapped around parts of a cable to be sealed. Tacky and highly adherent mastic formulations, which are advantageous for cable sealing but especially difficult to handle, can thus be made more acceptable for commercial use.

The term "mastic" is generally understood by people familiar with this field of technology to indicate materials which are capable of some degree of cold flow or creeping flow in use, which enables mastic materials, when used as sealants, to take up irregularities or dimensional variations caused by thermal expansion and contraction of the parts to be sealed. Such materials normally undergo such creeping flow in storage, as well as in use, which makes them difficult to handle. For example, a 1 cm thick sheet, even if stored flat, may flow in 24 hours at room temperature so as to increase its dimensions outwards by 5-10%, while if stored on end without adequate support it would progressively slump and lose its sheet form. The term "in storage" will be understood as referring to the usual storage conditions encountered by such materials, for example a temperature range from $-10°$ C. to $+40°$ C. From the range of various materials which are known as mastics, it is preferred to use those which are completely or largely based on organic polymer materials, preferably in formulations which are substantially impervious to moisture, as hereinafter described.

It may be possible, for some purposes, to use the mastic sheet according to the present invention while it is still in the storage container, for example by merely removing a top portion of the container to expose one main surface of the sheet and then wrapping the sheet and the container together around an article to which the mastic is to be applied. It is preferred, however, that the container be lined and/or otherwise arranged to permit removal therefrom of the material substantially still in the said sheet form. For example, this may be achieved by having a low-adhesion release foil in contact with at least one of the main sheet surfaces of the mastic material, and by having the inner surface of the container at least partly covered with low-adhesion release material, so that the mastic sheet can be lifted out and handled by means of the release foil. The mastic sheet and foil together may be wrapped around an article such as a portion of a cable, or the release foil maybe progressively removed as the mastic sheet is wrapped around. Suitable release materials for the foil or for the inner surface of the container are known, for example polytetrafluoroethylene or silicones.

The container may enclose one or more space fillers arranged to occupy any free space between the mastic material and the inner surface of the container. For example, such a space filler may over lie substantially all of one of the main sheet surfaces of mastic material, so as to take up the free space remaining after a container, for example a flat-box-type container, has been partly filled with the mastic material. It is of course possible to fill such a container to the top with the mastic, in which case a flush-fitting lid can be used without any space filler, but partial filling of the container is usually more convenient in practice. A lid shaped to project down into the partly—filled container may serve to fill the free space instead of a separate space—filler. Resilent space fillers may be used advantageously to keep the mastic material under slight compression when the lid is secured.

A preferred form of container for the present invention is a flat box having (a) a base of a size and shape to support one of the main sheet surfaces of the mastic material, (b) sides up-standing from the base to a height at least equal to, preferably exceeding by up to 100%, the sheet thickness of the mastic material, and (c) a removable lid fitting over at least part of the sides so as to enclose the mastic material. A generally square or rectangular box is preferred, although other shapes, and indeed other forms of container, are not excluded. In a preferred form of box, the sides extend from the base and are arranged to be folded down towards the plane of the base to expose the sheet edges of the mastic material for easier access in use. The folding down may be achieved by tearing suitable perforations at the corners, or, preferably, by suitably folded corners which can be simply unfolded, to lower the sides when required.

Preferably, the sheet length and sheet breadth are each at least 10 times, preferably at least 20 times, more preferably at least 30 times the sheet thickness, thicknesses of at least 0.5 cm, preferably at least 1 cm, and not more than 3 cm, preferably not more than 2 cm, having been found convenient in use for the cable splice enclosures hereinafter described. Although various arrangements of the mastic sheet in the container can be envisaged, a substantially continuous flat sheet form is preferred. A single unfolded sheet in the container is also preferred, although two or more sheets or a folded single sheet could conceivably be enclosed in a single container with a suitable separating release foil between adjacent sheets or folds. The form and dimensions of the sheet are not critical, provided that adequate resistance to creeping flow can be achieved by the container.

The mastic material will preferably have a viscosity at room temperature greater than 4000 Pa.s. At higher temperatures, such as those encountered in a power cable, for example at 70° C., the mastic will preferably have a viscosity within the range of 500 Pa.s. to 4000 Pa.s. Preferably, the mastic material will have sufficient non-resilient flexibility to be wrapped around a radius of 12 cm, preferably 8 cm, more preferably 4 cm at a temperature above 0° C., preferably above −10° C., substantially without any spontaneous unwrapping.

The composition of the mastic material may be selected by the usual criteria to suit the requirements of the end use in question. A particularly useful mastic material for cable sealing comprises a blend containing 10 to 80% ethylene/vinyl acetate copolymer and 90–20% polyisobutylene; preferably 20 to 40% of the ethylene/vinyl acetate copolymer and 80 to 60% of the polyisobutylene, based on the total weight of those two polymers. Pigments, antioxidants, tackifiers, and other additives may be included as required in known manner, and known compounding techniques may be used to mix the ingredients.

The invention includes a kit of parts for sealing, joining or terminating cables, comprising a heat-recoverable closure member and cable-sealing mastic material as hereinbefore or hereinafter described. The cable may be sealed at intervals simply to provide a water block after removing the cable sheath, applying the mastic according to the present invention, and recovering a heat-recoverable sleeve over the exposed cable components and mastic, or the sealing may be effected in the area of a joint or splice or termination of the cable. In such a kit, the mastic material preferably has a viscosity within the range from 50 Pa.s to 2500 Pa.s at the higher temperatures which it experiences, e.g. 70° to 160° C. when the closure member is being heat-recovered around the mastic material applied to parts of a cable, so that the mastic material flows and seals the cable within the resulting heat-recovered enclosure.

The invention also provides a method of sealing a cable wherein sheet mastic material as hereinbefore or hereinafter described is wrapped around exposed internal components of the cable, preferably after removal of the mastic sheet from the said container, and a heat-recoverable closure member is heat-recovered around the wrapped mastic sheet thereby causing the mastic material to flow and seal the cable and forming a protective enclosure around the mastic seal.

A preferred form of the invention will now be described, wherein this method is applied to forming a moisture-blocked joint between at least 2 electric power cables, wherein outer jackets of the cables are removed to expose the cores thereof, and insulation of the cores is removed or disturbed for access to the conductors thereof; wherein electrical connection is made between the conductors of the cables: wherein the said mastic material is disposed around the cable cores; wherein blocking material is located within the joint so as to prevent the mastic material from migrating away from the connections into or around the cables; and wherein the closure member is recovered around the jointed cables so as to enclose the cable connections and the sealing and blocking materials. Heat-recoverable sleeves for cable sealing are well known but a preferred heat-recoverable sleeve for the present invention comprises polymeric material having fibres embedded therein, as sold by Raychem.

The blocking material is thus arranged in a cable joint specifically to prevent migration of the preferably water-impervious mastic sealing material along the cable itself. This is of particular importance in the case of multi-core cables, where paths that potentially could allow transmission of moisture inherently exist in the cable in the region between the cores. The cable blocking disclosed for example in the above-mentioned patent specifications may not be fully effective in this area since it is applied only around the outside of a plurality of conductive elements.

Preferably the sealing material may be arranged within the joint such that it encapsulates, i.e. completely encloses the electrical connections between the cables. In this case, even if moisture should find its way to the inside of the protective sleeve, whether from within the cable itself or by flowing in between the cable and the sleeve, it will be prevented from reaching the electrical connections, which are electrically the most vulnerable parts of the joint. The electrical connections in the case of a branch joint may advantageously be made by a multi-core connector of known configuration, and in the case of an in-line joint, the connections may be made by crimping or screw connectors. The sealing material can then completely encapsulate the branch or in-line connectors. Such positioning of the sealing material thus completely ensures that any moisture escaping into the joint between the conductors and the individual core insulation cannot form a conductive path in the connection region from one conductor core to another.

The sealing material, in the case of a multi-core cable, alternatively, or additionally, may be arranged so as to block ingress of moisture from within the cable by being located in the crutch region between the cores of the cables where the cores emerge from the cable jacket. A further quantity of sealing material may then advantageously be located around the cores at the crutch region adjacent each cable jacket.

It may well be sufficient that the blocking material merely abuts against the sealing material at the crutch region, or the blocking material may encapsulate the sealing material, and may extend completely across the joint, that is to say, it abuts or even overlaps the cable jacket on each side of the joint, and is preferably sealed thereto. Preferably, the blocking material surrounds the cable cores in the crutch region of multi-core cables. The blocking material may be applied to the joint in the form of a tape or a sheet, e.g. of felt or as a mastic or hot-melt adhesive, as described later.

Mastic sealant material that is impervious to moisture and that is suitable for use as the sealing material is known per se, as is its use in the moisture blocking of a cable, for example a telephone cable. However, in order to have a material that has sufficiently low viscosity to allow it to penetrate and seal completely the region between the three or four cores of a multi-core electrical power cable the material generally has to be non-curing or non-crosslinkable. The problem to be overcome here is that the material has be be hot (lower viscosity) in order to flow, but the cable cores are of relatively large cross-section (ranging from 1.5 mm$^2$ to 300 mm$^2$ or more, depending on the current rating of the cable), of highly thermally conductive material (usually copper or aluminium), and are close together. Thus the cores act as a very efficient heat sink. The material must not cool too much nor too quickly, nor cure, until the regions between, and around, the cores of the cable and/or the connections are substantially completely filled with the sealant. During thermal cycling of the cable in normal operation, the conductor temperature can reach temperatures as high as 95° C. At this temperature, and particularly under the influence of water pressure (which can be equivalent to a head of water of as much as 1 meter, or more) from within the cable, there is a tendency for the sealant to be physically driven away along the cable, thus allowing moisture to enter the electrically vulnerable region around the core connections, possibly leading to electrical breakdown of the cable. The problem is exacerbated by the fact that the cores of electric power cables are large and rigid (being of solid or stranded configuration), and by the requirement for making the cut-back length (and thus the exposed length of the cores) at the joint as short as possible. This means that the cores cannot be pulled far apart from each other for fear of damaging the cable jacket thus making it difficult to insert sealing material between the cores. The minimum cross-sectional area of each conductor of a low voltage electric power cable having sector-shaped cores would be in the region of 6 mm$^2$, with a corresponding effective core diameter of about 4 mm, whilst typical dimensions for a 1 kV cable would be 150 mm$^2$ and 18 mm respectively. A typical 1 kV branch cable would have a sector-shaped conductor cross-section of about 50 mm$^2$ to 70 mm$^2$ and an effective core diameter of about 12 mm.

The moisture-, and especially water-, impervious sealing material is advantageously chosen for its ability to form a good bond both to polyvinylchloride and to polyethylene, these being the most common materials used as insulation for plastic insulated cables. The material may, however, not bond but may form the required moisture sealing by means of external pressure applied thereto. It is also advantageous that the sealing material bond to metals, such as aluminium, used for connectors of the cable conductors. Since its positioning is in some instances such that not a great deal of heat can be expected to reach it, for example between the cores of a cable, it should be sufficiently soft at the relatively low temperatures around 40° C. it will in fact experience on installation of the cable joint. A composition based on a 50:50 mixture (by weight) of polyisobutylene and atactic polypropylene has been found to be particularly suitable in such positions. There is no specific requirement for this material to cure, but this would not be a disadvantage provided that good cable blocking was obtained. However, advantageously the sealing material is not rigid, thus allowing it to accommodate thermal stresses, occurring for example during load cycling of the operating cable, that result in axial movement of the cable. Although the sealing material located between the cable cores may be the same as the sealing material located around the cores, these materials can be different.

In a preferred embodiment, the sealing material in the form of a mastic has a melting point between about 91° C. and 93° C. as measured by the ring and ball (R and B) softening method, or a 50% penetration between about 50° C. and 54° C. as measured by the thermomechanical analysis (TMA) method. The R and B melting point should exceed the maximum operating temperature of the cable, which for a PVC insulated cable would typically be about 70° C. and for a polyethylene insulated cable would typically be about 90° C. Its viscosity advantageously has a temperature profile as given by the following table:

| Temperature °C. | 70 | 90 | 120 | 160 |
| --- | --- | --- | --- | --- |
| Viscosity · Pascal sec | 1300–2500 | 450–700 | 150–220 | 50–80 |

The material should have a water absorption of $<1\%$. The sealing material should wet out the surface of the components of the joints it contacts and should fail cohesively when peeled therefrom. That is to say, its peel adhesion (with respect to the joint components) should be higher than the cohesive strength of the material itself.

Preferred examples of sealing mastic contain an EVA/polyisobutylene blend, e.g. an EVA acid terpolymer (such as Elvax 4310 available from DuPont comprising 24% to 27% by weight of the weight of the total composition), polyisobutylene (such as Oppanol B10, (Trade Mark) comprising 60% to 55% of the total composition), a tackifier resin (such as Escorez 5380, (Trade Mark) comprising 15% of the total composition), an antioxidant (such as Irganox 1010, (Trade Mark) comprising 1% of the total composition), and optionally a filler, e.g. a silica filler (such as Aerosil 200, (Trade Mark) comprising 0 to 2% of the composition).

The blocking material can advantageously be a fibrous material, and may comprise synthetic or glass fibres or a mixture thereof. The material may be provided as felt in strip or sheet form. Alternatively, the blocking material may comprise a closed-cell foam. Advantageously the blocking has some resilience after installation so as to enhance its conformity and contact with the cable cores. The blocking material can function solely as a physical block to prevent movement of the sealing material, and as such it need not itself seal against ingress of moisture. However, it is envisaged that the blocking material may be impregnated with a sealing material, preferably curable, so as further to restrict entry of moisture into the joint. When the blocking material is in strip or sheet form it can conveniently be inserted in one or more pieces between cable cores in regions where the cores cannot physically be prised far apart from each other.

In a further embodiment, the blocking material may itself be a sealing material, and preferably a curable material such as a curable hot-melt adhesive. Hot-melt adhesive used to from a seal in a cable joint is also known per se. Such material is advantageously curable, so that although its melting temperature may be less than the 95° C. operating temperature of the cables and could typically be in the range 60° to 70° C., it will physically remain in place at such temperatures due to its relatively high melt viscosity, and will thus resist any tendency of the (first) sealing material to migrate, for example under pressure from water and/or axial movement of the cable. This material may, but need not, bond to the cable insulation, since the moisture barrier is provided by the (first) sealing material. A suitable material is based on a compound of about 82% (by weight) of an acid terpolymer of ethylene, vinyl acetate (about 25% by weight of the terpolymer) and methacrylic acid, sold as ELVAX 4310, about 15% of a tackifier resin, sold as Escorez 5380, together with a curing agent, such as dicumyl peroxide, and a small amount of stabiliser.

The (first) sealing material thus provides a moisture block and the blocking material acts as a physical block for the sealing material. In an in-line joint, for example, the sealing material may be applied to each cable in the region where the cores emerge from the cable jacket and region where the cores emerge from the cable jacket (between the individual cores and around all of them), and the blocking material may extend completely therearound. In a branch joint where the or each core of the main cable is not broken, it is very difficult to prise the cores of the main cable sufficiently far apart to be able to insert the sealing material therebetween, so that this material is arranged fully to encapsulate the branch connector (which will itself completely contain the exposed portions of the cable conductors).

When the blocking material is itself a sealing material, the relative viscosities of the two sealing materials should be such that at room temperature the second (blocking) material is more viscous than the first material, and can in practice be virtually solid. At the installation temperature of the joint, for example at the recovery temperature of the outer heat-recoverable sleeve, the viscosity of the second material should fall sufficiently to ensure complete blocking, but then on cooling (and possibly cross-linking) its viscosity should rise again. Consequently when in operation the cables become hot, though not as hot as during installation, the viscosity of the second material is higher than the viscosity of the first material.

When either of the sealing and blocking materials comes into contact with more than one cable conductor or connector, then that material has to be electrically insulating, and preferably both materials, in all of the kinds of joint referred to herein, are electrically insulating.

Advantageously, the sealing and blocking materials will substantially fill the entire volume inside the protective sleeve around the cable cores and connectors. The greater part of this volume will be filled by the sealing material. Such filling enhances the mechanical strength of the joint, and also at voltages greater than about 10 kV it becomes important not to have voids that could give rise to damaging electrical discharges.

Relatively large quantities of sealing and blocking materials are required for the jointing of multi-core power cables due to their large physical size, and also for branch joints, due to the size of the branch connector, and because of this the sealant and blocking materials should be applied as discrete components to the cores before the sleeve is positioned around the connection region. Typically, about 250 gms of the sealing material may be required and about 500 gms of the blocking material if this were in the form of a sealing material. For example, with a cable cut-back length of 300 mm on a typical 1 kV cable with a branch joint, approximately 1200 grams of sealing mastic may be needed. The outer environmental protective sleeve, preferably a heat recoverable sleeve, may still advantageously have a, comparatively thin, internal coating, of hot-melt adhesive for example, in order to enhance its sealing on to the cable jackets, to prevent ingress of moisture from outside the cables.

In order to input sufficient heat into these relatively large quantities of materials, and especially when that material is disposed between the cores of a cable, and taking into account the heat-sink effect of the cables referred to above, a relatively large quantity of heat must be applied to the heat-recoverable sleeve (when such a sleeve is employed). In some instances, the quantity of heat needed can harm the well-known heat-recoverable polymeric sleeves that are commonly used for cable jointing. Accordingly, it is preferred that a sleeve be used that is a polymeric fabric sleeve comprising fibres, for example glass fibres. The fibres should be arranged to follow recovery of the sleeve, and advantageously at least some, or all, of the fibres are recoverable, thus contributing to, or being responsible for recovery of the sleeve. Suitable recoverable fabric sleeves are described in, for example, the following patent publications, the entire contents of which are herein incorporated by this reference: UK-2135632B, UK-2168645B, UK-2168649B, UK-2139142B, UK-2133740B, UK-2134334B, and EP-0324630A.

The present invention is applicable to joints between low voltage (of order 1 kV) cables or high voltage (>1 kV, generally greater than 15 kV) cables, and to in-line joints or branch joints.

Blocked cable joints and blocking methods in accordance with the present invention will now be described by way of example with reference to the accompanying drawing, in which.

Figure 1:
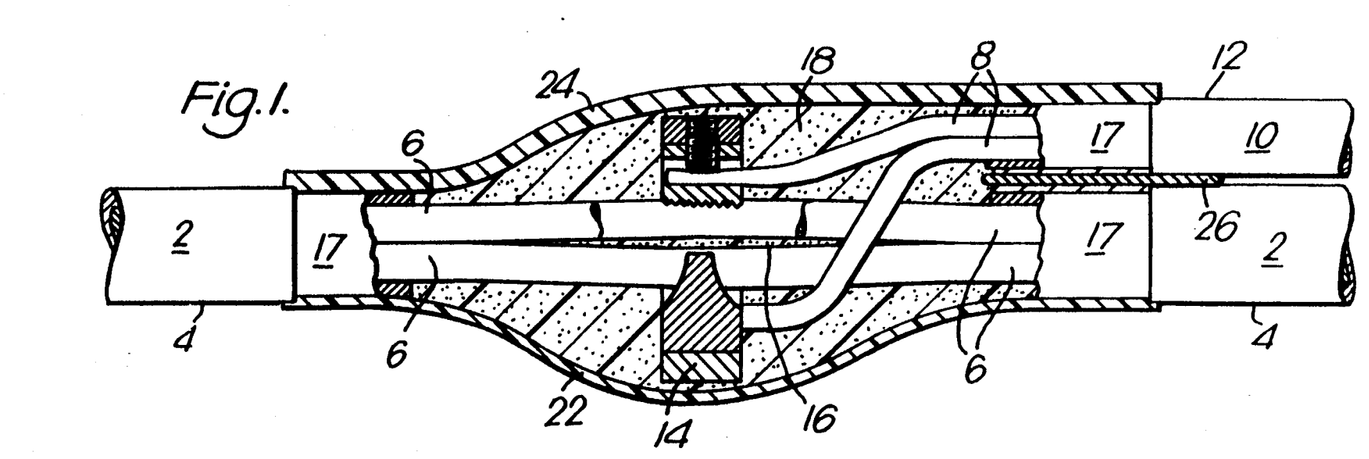
FIG. 1 shows schematically a 1 kV branch joint.

Referring to FIG. 1, the 1 kV branch joint comprises a four core main cable 2 having an outer insulating and protective jacket 4 and individually insulated cores 6 (only two of which are shown) each of 150 mm$^2$ cross-sectional area. The outer jacket 4 is removed at the region where the branch joint is to be made, but the cores 6 are not cut and their insulation initially remains intact. Four cores 8 (only two of which are shown) each of 50 mm$^2$ cross-section of a branch cable 10 are exposed beyond the end of its cable jacket 12. The cores 6 of the main cable 2 are carefully prised apart in the central portion of the joint, and a sausage-shaped wedge 16 of sealing mastic is inserted therebetween. Fibrous blocking material 17 in the form of felt strip is inserted in two pieces between the cores 6, so as to form a cross-shape, in the crutch region where the cores 6 emerge from the cable jacket 4 at each side of the joint region, and a further wrap of the material 17 is made around the four cores at those regions. Fibrous material 17 is similarly disposed between and around the cores 8 of the branch cable 10 where they emerge from the cable jacket 12. In each case, the free end of the outer wrap of felt can conveniently be secured by adhesive tape. The felt 17 is wrapped tightly around the cores 6,8 and is caused to fill the crutch regions therebetween so as to conform to the cores filling up any space therebetween and between the cores and the cable jackets 4,12. The cable cores are then squeezed together again. A wrap-around multi-core branch connector 14, of any suitable configuration, is clamped securely around the main cable cores 6, and the branch cable cores 8 are electrically connected thereinto (by means not shown) in conventional manner. Electrical interconnection between the cores 6 of the main cable 2 and the cores 8 of the branch cable 10 is achieved, in a known manner, by tightening screws (not shown) in the connector ring 14 that piece the insulation of the individual cores 6 whilst being insulated from each other, the screws being in electrical connection with the cores 8 of the branch cable 10.

A further body of sealing mastic 18, in the form of a sheet 100 according to the present invention, is removed from its silicone-lined container 110 (FIG. 3) by removing the lid 120 and space filler 130, folding down the sides 140, and holding it by release foil 150, and is then tightly wound around the connector 14 and the cores 6 and 8 adjacent thereto extending to the felt 17 at each end, with progressive removal of the foil 150. The material, which may or may not be the same, from which the wedge 16 and the body 18 are formed is impervious to moisture, especially water, so that the electrically vulnerable region around the exposed conductive parts of the joint is thus completely enclosed within this material, and the cores are insulated from one another. The sealing mastic 16 and 18 is thus physically retained by the blocking felt 17 axially of the joint, thus preventing its migration, under operation of the cables, away from the connector region and especially along the cables.

A heat-recoverable fabric sleeve 22 that has a comparatively thin internal coating of hot-melt adhesive (not shown) is wrapped around the sealing mastic 18 and overlaps the cable jackets 4 and 12, its longitudinal edges being secured together with a closure member 24.

A three-fingered, generally planar clip 26 is applied over one end of the sleeve 22 between the main cable 2 and the branch cable 10 so as to form the sleeve 22 into a figure-of-eight configuration, holding it around each of the two cables. A suitable clip and its operation is disclosed for example in UK patent publications 1604981B, 2019120B, 1604985B, 1604986B and 2095926B. The central finger of the clip 26, which as shown is located on the inside of the outer sleeve 22 is coated with a hot-melt adhesive sealing material (not shown), which enhances the sealing of the joint.

Heat is then applied by means of a gas torch to the sleeve 22 to effect its recovery about the main and branch cables. As the sleeve 22 warms up, heat is conducted therethrough to the sealing mastic 16 and 18 and to the hot-melt adhesive on the sleeve itself and on the clip 26. The sealing materials soften, and advantageously flow as the outer sleeve shrinks radially. The recovery force of the sleeve 22 tends to urge the sealing material into close conformity with the cable cores and branch connector. The softening mastic wedge 16 and tape 18 are forced more and more into conformity with the connector 14 and the cable cores 6 and 8 and to fill the regions therebetween and therearound. Heating is terminated when the sleeve 22 has shrunk into complete conformity with the underlying components and when it is judged that the sealing material has flowed so as substantially completely to fill any voids within the sleeve. In this condition and after cooling, the mastic material 16 and 18 will have formed a moisture seal around the connector 14, and will be axially retained by the felt 17, and enclosed within the sleeve 22.

Should any water or other moisture enter the joint region from either of the cables 2 or 10 or between the cables and the sleeve 22, the mastic will prevent it entering the region around the connector 14. The felt 17 will tend to hold the less viscous mastic 16, 18 in place even under high temperature (e.g. 95° C.) and pressure (e.g. 5 meters of water) operating conditions.

Figure 2:
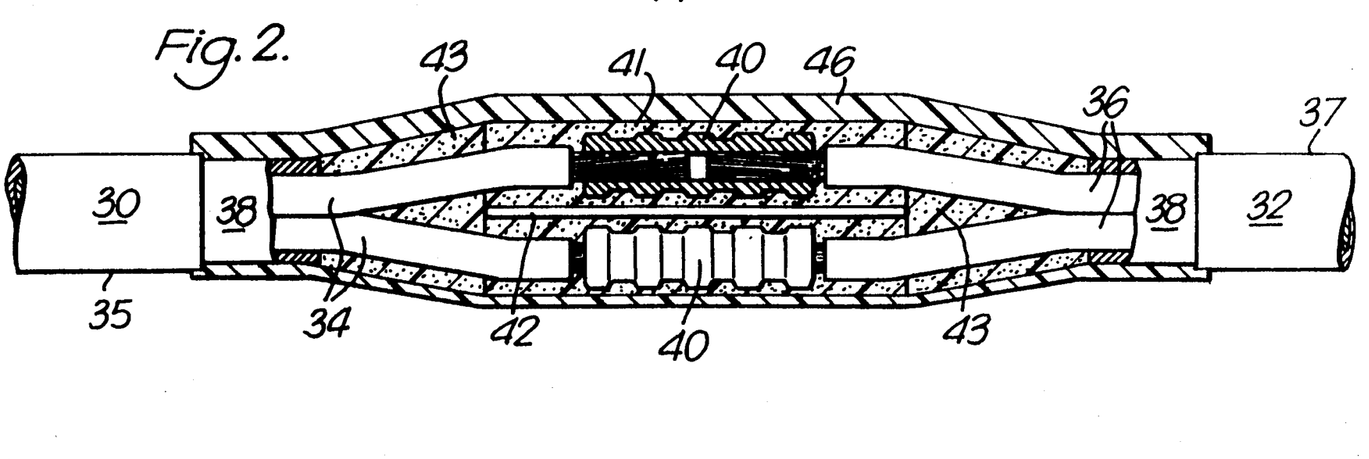
FIG. 2 shows schematically a 1 kV In-line joint.

Referring to FIG. 2, the 1 kV in-line joint is formed between two four-core cables 30,32. The cores 34,36 (only two of each being shown) are each of 150 mm$^2$ cross-section. After emerging from respective cut back cable jackets 35, 37 the cores are spread apart and pieces of felt 38 are urged into and around the respective crutch regions therebetween in analogous manner to that described with reference to FIG. 1. Corresponding exposed conductors of the cables 30,32 are electrically and mechanically connected together by crimps 40. A water-impervious mastic 43 from a sheet (not shown) according to the present invention is wound around each of the four cores of each cable at a region spaced apart from the end of the cable jackets, and a cross-shaped insulating spacer 42 is inserted between the cores so as further to insulate the crimps 40 from each other. Further mastic 41 is wound from a sheet as aforesaid around the spacer 42 and around the internally located mastic 43 to complete the water block at that region. The mastic 41, 43 extends longitudinally so as to fill the region between the felt strips 38 at each end. Finally, a tubular heat recoverable fabric sleeve 46 internally coated with a thin layer of hot-melt adhesive, which had been slid along one of the cables 30,32 before beginning the joint, is positioned over the mastic 41,43, and may advantageously overlap the cable jackets 35,37.

As described with reference to FIG. 1, heat is applied to the sleeve 46 to effect its recovery and to cause the mastic 41, to soften, conform and seal around the crimp region. The felt 38 will prevent migration of the mastic 43 along the cables 30,32.

Although as shown in FIGS. 1 and 2, sufficient confinement of the sealing material is obtained by having blocks only at each end of the sealing material, it is envisaged that in some instances the mastic sealing material is completely enclosed by the blocking material.

Advantageously, the protective sleeve itself forms a seal, preferably against moisture, on to the cable jackets and on to the blocking material.

Figure 3:
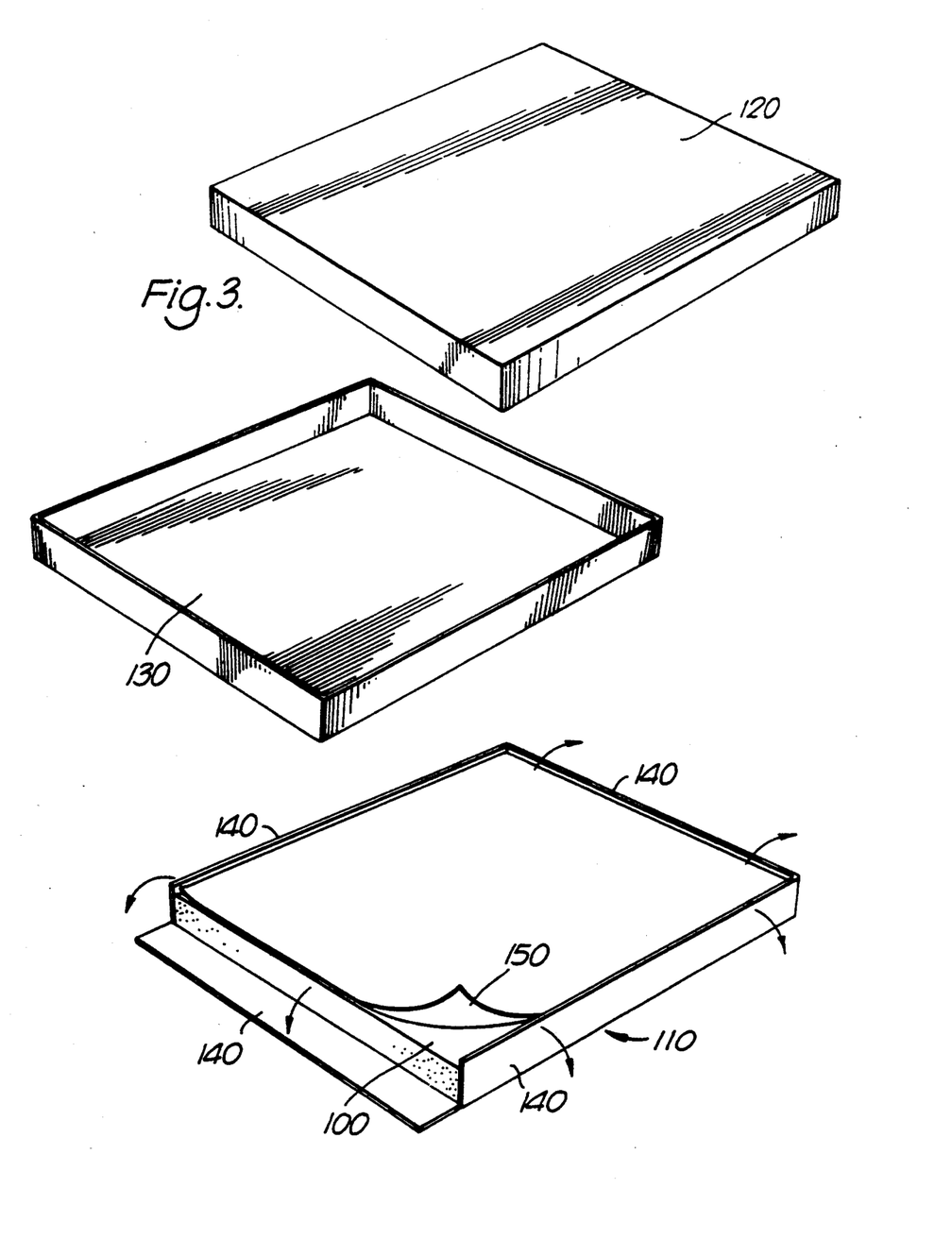
FIG. 3 shows schematically a contained mastic sheet according to the present invention.
Figure 4:
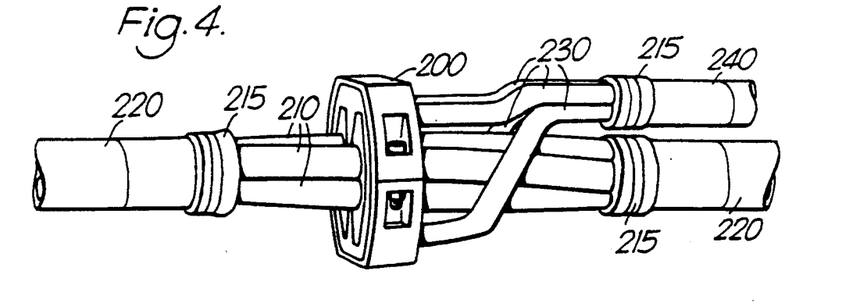
FIGS. 4, 5, 5A and 6–11 show pictorially the use of a mastic sheet according to the invention in a cable splice.

The sealing mastic material in sheet form according to the present invention may be prepared by pouring the mastic in a hot flowable state (e.g. at 100° C.) into a suitable container, e.g. a silicone-coated box of cardboard or other suitable material as shown in FIG. 3, allowing to cool, applying the silicone-coated release foil, inserting the space filler, and applying the lid.

Referring now to FIGS. 4 to 11, FIG. 4 shows a multi-core connector 200 of known design connecting the cores 210 of a cable 220 to the cores 230 of a branch cable 240 in known manner. A portion of sealing material (not shown) has been inserted between the cable cores 210, and blocking felt 215 has been applied to the crutch regions of the stripped-back cables to confine the sealing material as described above.

Figures 5, 5A:
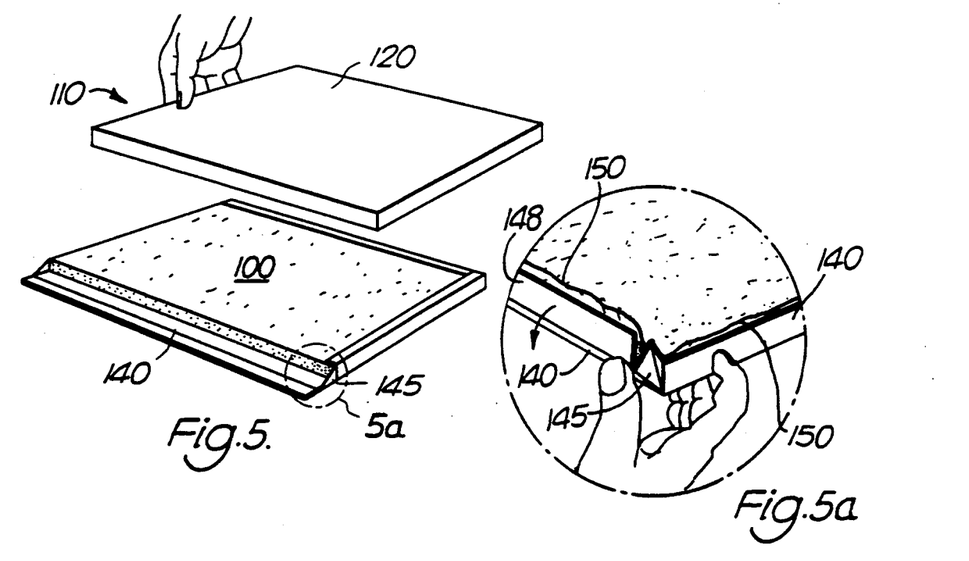

In FIG. 5, a mastic sheet 100 is released from its container 110 by removing the lid 120 and folding down the sides 140 by means of suitably folded corners 145 (see inset) and handling flaps 148 (shown in an enlarged view in FIG. 5a).

Figure 6:
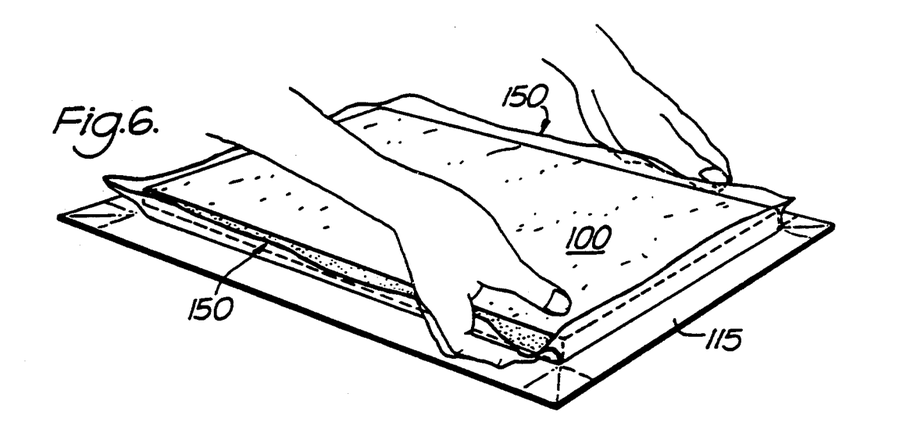

In FIG. 6, the mastic sheet 100 is picked up together with its underlying release foil 150 from the laid-flat portion of the container 115.

Figure 7:
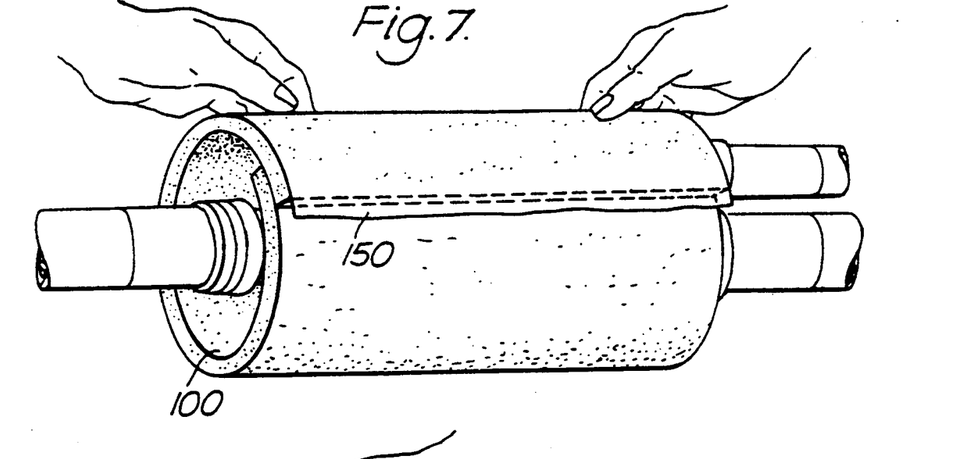
Figure 8:
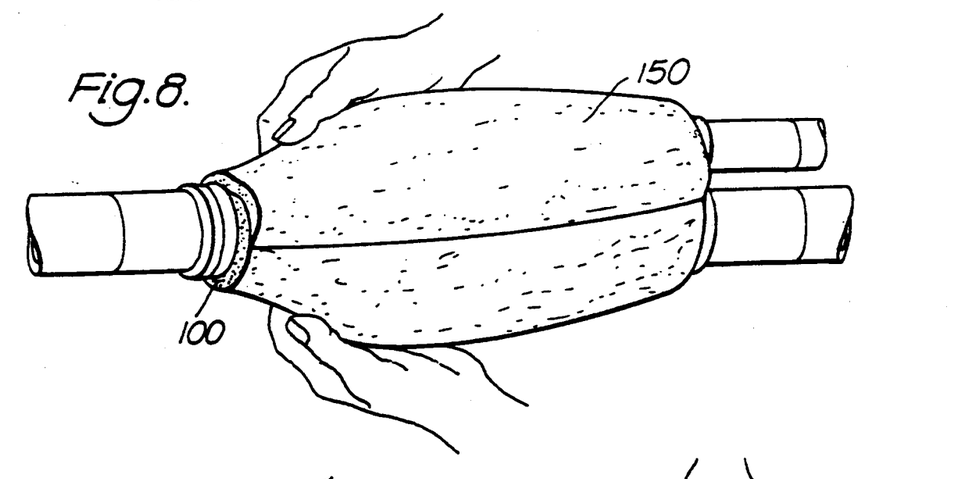

In FIG. 7, the mastic sheet 100 is wrapped around the entire connection assembly and covers substantially the whole space between the stripped-back ends of the cable insulation on either side of the connector. The release foil 150 is still in position on the outer surface of the wrapped mastic sheet, and conveniently allows pressing of the mastic to conform more closely around the splice assembly, as shown in FIG. 8.

Figure 9:
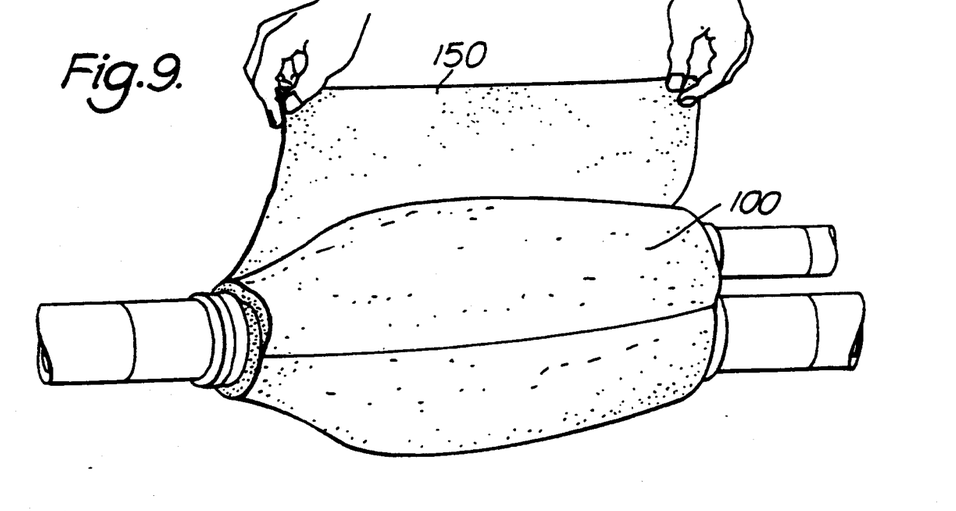
Figure 10:
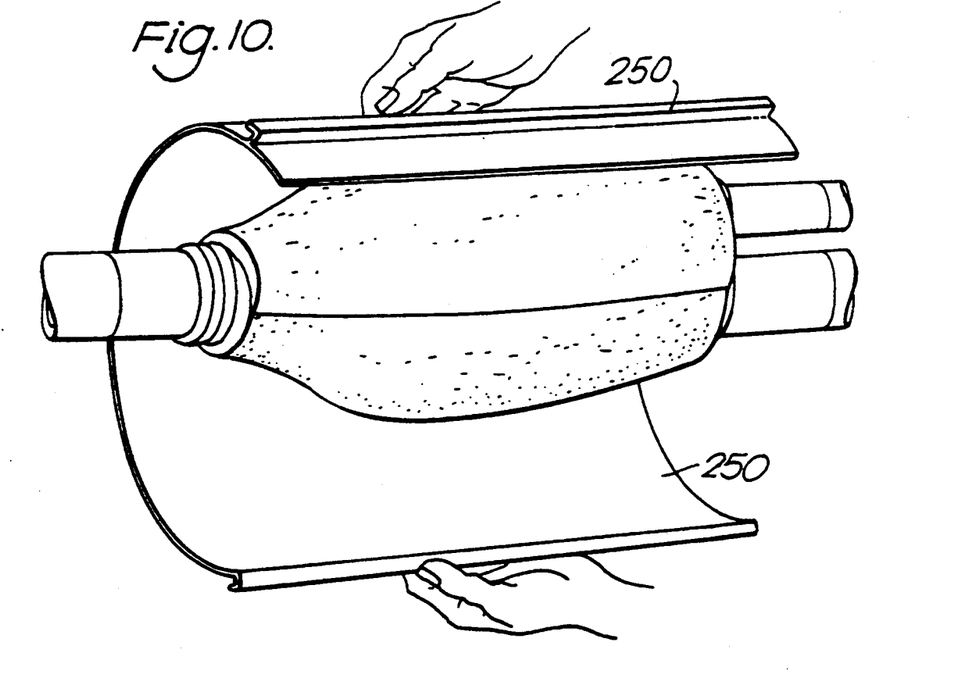
Figure 11:
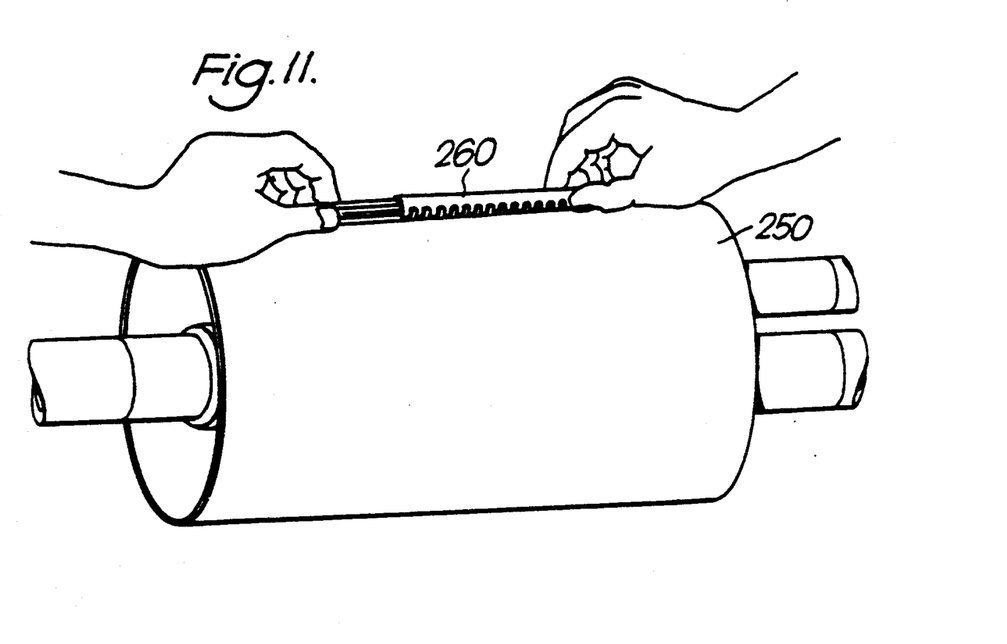

In FIG. 9, the release foil 150 is being removed from the wrapped mastic sheet 100, after which a heat-shrinkable wraparound sleeve 250 of the kind marketed by Raychem is wrapped around the assembly as shown in FIG. 10, secured with the famous Raychem rail-and-channel closure 260 as shown in FIG. 11, and shrunk by heating in known manner (not shown) as described above.

The heat applied to shrink the sleeve 250 causes the mastic sheet to flow and fill the contracting enclosure formed by the sleeve, thus sealing the resulting cable splice against ingress of moisture.

The sealing mastic sheet may be prepared, for example, by mixing the aforementioned (parts by weight)
Oppanol B10 polyisobutylene; 60%
Elvax 4310 EVA and terpolymer; 24%
Escorez 5380 tacklfier; 15%
Irganox 1010 antioxidant; 1%
In a twin-blade mixer/extruder pre-heated to 150° C., starting with the last three ingredients until homogeneous then adding the Oppanol in stages over 20 minutes mixing each addition until homogeneous. Mixing is then continued until the temperature of the mixture reaches 120° C., whereupon it is discharged into the silicon-lined cardboard boxes, taking care not to touch the material as it is hot and extremely sticky. Alternatively, the mastic may be discharged into a heated holding vessel for subsequent filling into the boxes. After sufficient mastic has flowed into each box to form the sheet of desired dimensions, it is allowed to cool, the release foil, space filler (if used) and lid are placed on top, and the box is sealed with strong packaging tape for storage and transport to its place of use.

We claim:

1. Cable sealing mastic comprising a sheet of mastic material inherently capable of significant creeping flow in storage in a close-fitting storage container, said container
   (a) being arranged to resist the said flow in all directions and thus maintaining the material substantially in the said sheet form in storage, and
   (b) being lined and arranged to permit application of the material substantially still in the said sheet form to parts of a cable to be sealed by the said material in use.

2. Material according to claim 1, wherein the container is lined and arranged to permit removal therefrom of the material substantially still in the said sheet form.

3. Material according to claim 2, having a low-adhesion release foil in contact with at least one of the main sheet surfaces of the mastic material.

4. Material according to claim 2, wherein the inner surface of the container is at least partly covered with low adhesion release material.

5. Material according to claim 1, wherein the container encloses one or more space fillers arranged to occupy any free space between the mastic material and the inner surface of the container.

6. Material according to claim 5, having a space filler overlying substantially all of one of the main sheet surfaces of the mastic material.

7. Material according to claim 1, wherein the container is a flat box having (a) a base of a size and shape to support one of the main sheet surfaces of the mastic material, (b) sides upstanding from the base to a height at least equal to the sheet thickness of the mastic material, and (c) a removable lid fitting over at least part of sides so as to enclose the mastic material.

8. Material according to claim 7, wherein the sides extend from the base and are arranged to be folded down towards the plane of the base to expose the sheet edges of the mastic material.

9. Material according to claim 1, whose sheet length and sheet breadth are each at least 10 times the sheet thickness.

10. Material according to claim 9, wherein the sheet thickness is at least 0.5 centimeter.

11. Material according to claim 1, in substantially continuous flat sheet form in the container.

12. Material according to claim 11, in the form of a single unfolded sheet in the container.

13. Material according to claim 1, the sheet material having a viscosity at room temperature greater than 4000 Pa.s.

14. Material according to claim 1, the sheet material having a viscosity at 70° C. within the range from 500 Pa.s to 4000 Pa.s.

15. Material according to claim 1, the sheet having a sufficient non-resilient flexibility to be wrapped around a radius of 12 centimeters at a temperature above 0° C. substantially without any spontaneous unwrapping.

16. Material according to claim 1, the sheet material comprising a blend of ethylene/vinyl acetate copolymer and polyisobutylene.

17. Material according to claim 16, the sheet material comprising 20 to 40% by weight of ethylene/vinyl acetate copolymer and 80 to 60% by weight of the polyisobutylene, based on the total weight of those two polymers.

18. A kit of parts for sealing, joining or terminating cables, comprising a heat-recoverable closure member and cable-sealing mastic comprising a sheet of mastic material inherently capable of significant creeping flow in storage in a close fitting container, said container
   (a) being arranged to resist the said flow in all directions and thus maintaining the material substantially in the said sheet form in storage, and
   (b) being lined and arranged to permit application of the material substantially still in the said sheet form to parts of a cable to be sealed by the said material in use.

19. A kit according to claim 18, wherein the sheet material has a viscosity within the range from 50 Pa.s to 2500 Pa.s at 160° C.

* * * * *